July 2, 1968  R. G. BENNETT  3,390,780
DUAL STAGE FUEL FILTER AND FILTER ASSEMBLY HEAD
Filed May 16, 1966
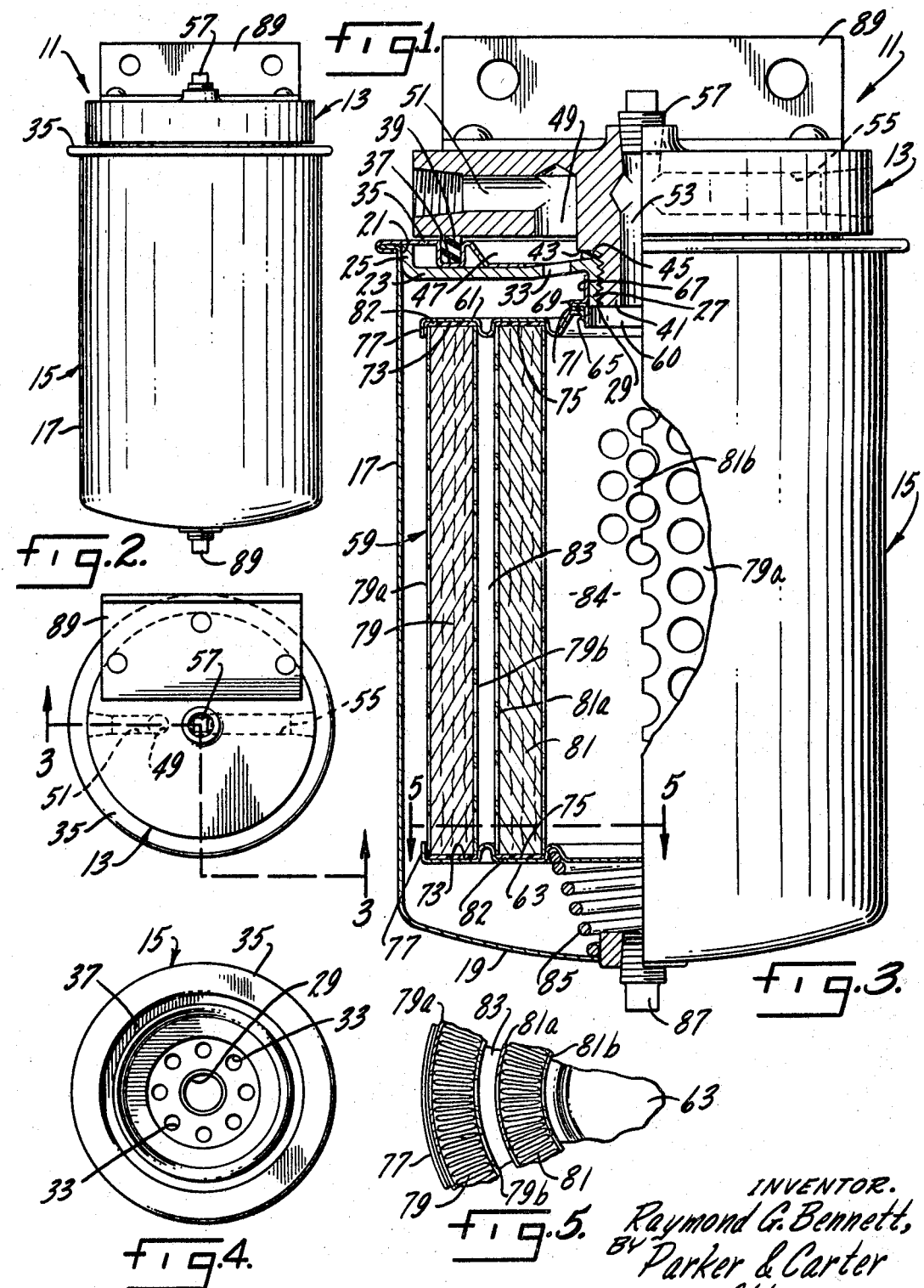
INVENTOR.
Raymond G. Bennett,
BY Parker & Carter
Attorneys.

United States Patent Office 3,390,780
Patented July 2, 1968

3,390,780
DUAL STAGE FUEL FILTER AND FILTER
ASSEMBLY HEAD
Raymond G. Bennett, Olympia Fields, Ill., assignor to
Novo Industrial Corporation, New York, N.Y., a corporation of New York
Filed May 16, 1966, Ser. No. 550,311
2 Claims. (Cl. 210—338)

ABSTRACT OF THE DISCLOSURE

A filter assembly including a disk-shaped head and a cartridge containing a filter element. The disk-shaped head has a center portion of reduced diameter extending from one side thereof with an axial passage extending therethrough to an opening located at the end of the center portion. Threads are located on the outside of the center portion. An inlet passage in the head has an opening to an annular space between the cartridge and the head with this opening located non-axially of the head. This passage extends radially from the outside of the head to intersect a passage extending from the opening. The filter element has spaced inner and outer annular filtering members comprising pleated paper backed on each side by perforated metal sheets with the perforations in the inner sheet of each being smaller than the perforations in the outer sheet of each. The filter element has a centrally located outlet at one end thereof which connects to the outlet opening in the center portion of the head.

---

This invention is concerned with filters for liquid fuels and more particularly with filters for liquid fuels which are supplied to engines by injection devices.

An object of this invention is a filter element capable of removing particles as small as two microns.

Another object is a filter element having two filtering stages.

Another object is a filter assembly in which the filter element and its housing are formed in one replaceable cartridge.

Another object is a filter assembly in which the filter element cartridge is screw threaded onto a filter head.

Another object is a filter assembly in which the filter head and filter cartridge cooperate to form an annular flow chamber to distribute the liquid to be filtered into the filter cartridge around the outer surface of the filter element.

Another object is a filter element having two coaxially spaced annular filtering media of pleated paper.

Another object is a filter head formed from a disk and having inlet and outlet passages formed by drilling.

Another object is a filter head having an eccentrically located inlet opening to the filter element cartridge.

Other objects will be found in the following specification, claims and drawings.

The invention is illustrated more or less diagrammatically in the following drawings wherein:

FIGURE 1 is a side elevational view of a filter assembly of this invention;
FIGURE 2 is a top plan view of the filter assembly;
FIGURE 3 is a partial cross-sectional view taken along line 3—3 of FIGURE 2;
FIGURE 4 is a top end view of the filter element cartridge; and
FIGURE 5 is a partial lateral cross-sectional view through the filter element and cartridge taken along line 5—5 of FIGURE 3.

As shown in the drawings, the filter assembly 11 includes a head 13 and a cartridge 15. The cartridge 15 is designed as a self-contained throw-away unit which can be connected to the filter head preferably by a threaded connection. The cartridge includes a container-like housing 17 having a closed end 19 and an open end 21. The open end 21 is covered by a cap 23 which is recessed inside the housing 17 and has a turned edge portion 25 adapted to contact the inner surface of the housing. The cap is also equipped with a centrally located inwardly extending collar 27 through which a center, internally threaded, opening 29 is formed. A plurality of smaller openings 33 are formed in the cap in an annular ring concentric with and located radially outwardly of the center opening 29.

An annular band of sheet metal 35 is fastened to the outer portion of the cap 23 and overlaps the wall of the housing 17 to fasten the cap in place on the container. Formed in this sheet metal band is an annular outwardly opening groove 37 which is adapted to receive a seal 39 which contacts the filter head 13 when it is in threaded relationship with the cartridge.

The filter head 13 is disk shaped and has an integral externally threaded projection 41 of reduced diameter which meshes with the internal threads of the central opening 29 of the cap 23 to secure the cartridge to the head. At the base of the threaded projection is an annular shoulder 43 which engages a gasket 45 located between the cap 23 and the shoulder to act as a seal.

With the cartridge 15 screw threaded to the head 13, an annular passage 47 is formed between the cap 23 and the head 13. The inner and outer boundaries of this passage are defined by the annular seal 39 and the threaded projection 41. As can be seen in FIGURE 3, the smaller openings 33 of the cap open into this annular passage. Also opening into this passage is a longitudinal, eccentric passage 49 formed in the head 13. This passage connects to a radial passage 51 extending from the circumference of the head 13 to form an inlet to the filter cartridge. An axial longitudinal passage 53 is also formed in the head and extends through the projection 41. Another radial passage 55, on the opposite side of the head from the first radial passage 51, intersects the axial longitudinal passage 53 to form an outlet for the filter cartridge. The axial longitudinal passage 53 extends through the head 13 and is plugged at 57 at the top of the head. The passages 49, 51, 53 and 55 can be formed by drilling intersecting passages in the generally disk shaped head 13. Thus, the need for an elaborate casting for the head is eliminated.

A cylindrical filter element 59 fits inside the housing 17 and has an axial outlet 60 leading into the axial longitudinal passage 53 of the head 13. The filter element includes end caps 61 and 63 with end cap 61 having a central opening 65 aligned with outlet 60 and which receives a sleeve 67 that fits over the outer surface of the collar 27 of the cap 23. This sleeve has an outwardly extending flange 69 which extends over a portion of the end cap 61 to engage a gasket 71 located between the flange and the end cap. The opposite end cap 63 of the filter element is imperforate. Concentric inwardly opening annular grooves 73 and 75 are formed in the end caps with similar grooves of one cap in alignment with similar grooves of the other cap. The outer edges 77 of the end caps are bent towards each other.

The filter media consist of outer and inner tubular members 79 and 81 of pleated filter paper. The tubular filter paper members are each backed on the inside and outside by perforated metal sheets 79a and 79b and 81a and 81b formed into tubes. The inner perforated metal sheets have smaller perforations than the outer sheets for additional strength. Each filter paper member and its perforated metal sheets is secured to the end caps by plastisol 82 with the outer filter paper member 79 and its perforated metal sheets secured in the outer grooves 73 and the inner filter paper member 81 and its perforated metal sheets secured in the inner grooves 75. The inner and outer tubular filter paper members are separated by an annular open space 83. A central passage 84 is formed inside of the inner tubular filter paper member and it connects with the outlet 60 of the filter element.

The outer filter member 79 is designed to trap particles of a size of ten microns and larger and the inner filter member is designed to trap all particles two microns and larger in size. A conical spring 85 may be located between the filter element end cap 63 and the closed end 19 of the housing 17. A plug 87 may be located in the closed end of the housing 17 for drainage purposes. A bracket 89 may be secured to the filter head 13 for mounting the filter assembly.

The use, operation and function of this invention are as follows:

The filter assembly of this invention is intended to be used in the fuel injection systems of gasoline and diesel engines. The filter assembly is designed to trap small impurities that could clog such fuel injectors. Specifically it is intended for use in conjunction with a primary filter which will remove particles of fifty microns and larger size with this filter assembly intended to remove impurities as small as two microns in size.

The filter assembly is of the spin-on variety in which a removable and disposable cartridge 15 can be screw threaded onto a filter head 13 permanently attached to the engine by means of a bracket 89. The filter head 13 is constructed to permit in-line as well as offset installation of the filter assembly in a fuel line.

The filter head 13 is designed so that it can be manufactured from a solid generally disk shaped piece of metal simply by drilling intersecting passages therein and threading these passages as required. The design of this head eliminates the need for a special casting containing annular passages to distribute fluid completely around the open end of the filter cartridge. Distribution of the fluid around the open end of the cartridge is obtained by providing an annular flow chamber 47 between the filter head and the cap of the cartridge.

The fuel enters the head through radial passage 51, passes through longitudinal passage 49 and into the annular passage 47 formed between the head and the cartridge. The fluid then passes through the openings 33 of the cap and into the housing 17 where it flows around the outside of the cylindrical filter element 59. The fluid then passes through the outer pleated filter paper 79, into the annular space 83, through the inner pleated filter paper 81, into the central passage 84, through the outlet 60 of the element, into the axial longitudinal passage 53 formed in the threaded projection 41 of the head 13 and out through the radial passage 55.

Upon termination of the useful life of the filter element, the element can be changed simply by unscrewing the filter cartridge and replacing it with a new one.

I claim:
1. A filter assembly including:
   a substantially flat and solid disk-shaped head having an integral center portion of reduced diameter projecting from one side thereof with threads formed on the outside of said projecting portion,
   a cartridge housing adapted to receive a filter element and having an open end sealed by a cap and closed end,
   said cap being recessed from the open end of said housing and having an integral central threaded opening adapted to engage the threads of said projecting portion of said head for attachment of said cartridge housing to said disk-shaped head,
   an annular seal mounted on said cap and adapted to be positioned in sealing contact with said head when said projecting portion of said head is threadably attached to said cap,
   said head, annular seal, cap and projecting portion of said head defining an annular passage between said head and said cartridge,
   at least one opening in said cap between said annular passage and said housing,
   an outlet passage in said head having an axially located opening and an axially extending passage in said projecting portion of said head,
   an inlet passage in said head having a non-axially located opening leading into said annular passage between said head and said cartridge with said inlet passage including a radial passage leading from the edge of said disk and an intersecting passage leading from said opening, and
   a filter element adapted to fit in said cartridge and having an axially located outlet at one end thereof with said outlet adapted to communicate with the axially located opening of said outlet passage of said head.

2. A filter cartridge for attachment to a filter head having a threaded outlet:
   said cartridge having a closed end and an open end closed by a cap having a central opening and at least one non-central opening with said central opening having threads adapted to mesh with the threads of the outlet of said head for attachment of said element to said head,
   said cartridge having inner and outer annular filtering members therein extending between two end caps and spaced apart radially from each other for series flow therethrough with each filtering member formed of pleated filter paper supported on the inside and outside by perforated metal with the perforations in the metal on the inside of each filtering member being smaller than the perforations in the metal on the outside of each filtering member to add strength to the inside support, and
   an axially extending passage located interiorly of said inner filtering member and communicate with said outlet.

References Cited
UNITED STATES PATENTS

| | | | |
|---|---|---|---|
| 1,464,822 | 8/1923 | Justus | 210—249 |
| 2,583,423 | 1/1952 | Hallinan | 210—443 |
| 2,867,328 | 1/1959 | Sorensen | 210—443 X |
| 2,995,250 | 8/1961 | Boewe et al. | 210—130 |
| 3,044,475 | 7/1962 | Thompson | 210—440 X |
| 3,262,563 | 7/1966 | Pall | 210—90 |
| 3,288,299 | 11/1966 | Paton et al. | 210—487 |

FOREIGN PATENTS 1,026,949   4/1966   Great Britain.

SAMIH N. ZAHARNA, *Primary Examiner.*
REUBEN FRIEDMAN, *Examiner.*
F. SPEAR, *Assistant Examiner.*